Patented June 17, 1941

2,246,062

UNITED STATES PATENT OFFICE 2,246,062

TITANIUM DIOXIDE COMPOSITE PIGMENT AND METHOD OF MAKING SAME

Walter W. Plechner, Metuchen, N. J., and Hugh V. Alessandroni, New York, N. Y., assignors to National Lead Company, New York, N. Y., a corporation of New Jersey No Drawing. Application June 16, 1938, Serial No. 214,046

3 Claims. (Cl. 134—58)

The present invention relates to composite titanium dioxide-calcium sulfate pigments and to methods for improving the capacity of such pigments to be wet by and to be dispersed in oleaginous film-forming vehicles.

In the industrial manufacture of pigmented oleaginous film-forming compositions such as paints and enamels the ability of a pigment readily to be wet by and to form a paste with the oleaginous vehicle is a factor of considerable importance with respect to any pigment. That is to say, the more quickly a pigment will be wet by a given quantity of oleaginous vehicle and will form a paste therewith, the more acceptable it will be to the paint trade and hence more salable. Titanium dioxide-calcium sulfate composite pigment as prepared up to the present time required considerable time before it was wet by an oleaginous vehicle to form a paste. By means of our invention as herein described it is possible to prepare a titanium dioxide-calcium sulfate composite pigment which is readily and quickly wet by oleaginous vehicles.

Thus, the principal object of the present invention is the preparation of a titanium dioxide-calcium sulfate composite pigment having improved low oil absorption properties and the capacity to be readily and uniformly wet by oleaginous vehicles. In its broadest aspect our invention embraces the dry-blending of previously-prepared, calcined titanium dioxide and previously-prepared, calcined calcium sulfate and subjecting the resulting mixture to a pulverizing mill treatment. Other objects and further details of our invention will be apparent from this description of our invention.

In the following description of our invention we have used the term "break" as indicative of the ease with which a given sample of pigment is wet by an oleaginous vehicle. In expressing this term quantitatively, it is coupled with a numerical value. The lower the numerical value, the lower will be the so-called "break" and hence the greater ease of wettability in oleaginous vehicles possessed by the pigment. The number value of the "break" is ascertained by mixing 400 grams of pigment with 125 grams of a suitable oleaginous vehicle and determining the number of seconds required, while mechanically mixing the pigment and vehicle, to form a uniform paste. In the tests reported in the following paragraphs and the values for the "break" contained therein, we have employed an oleaginous vehicle made up of 50 percent raw linseed oil and 50 percent of a typical 30 gallon ester gum varnish. For every one hundred pounds of ester gum (rosin esterified with glycerine) employed in making this varnish, 30 gallons of a 1 to 4 mixture of heat-bodied linseed oil and China wood oil were used. Thus, in speaking of a pigment having a "break" value of 120, or simply a "break" of 120, we mean that 400 grams of that pigment and 125 grams of the oleaginous vehicle as just described required 120 seconds of mechanical mixing to form a uniform paste.

Up to the present invention titanium dioxide-calcium sulfate composite pigments have been prepared by one of two standard methods. (1) The so-called co-precipitation method, which includes the addition of finely divided calcium sulfate to a hydrolyzable titanium salt solution, e. g., a titanium sulfate solution, and then the hydrolysis of the titanium solution. The resultant composite precipitate of calcium sulfate and hydrous titanium oxide is then subjected to a conjoint calcination, primarily to develop the pigment properties of the titanium dioxide. U. S. Patent No. 1,906,729 and No. 1,906,730 describe procedures which are examples of this method. (2) The so-called blending method by which previously-prepared, calcined and wet-milled titanium dioxide was mixed in the presence of an aqueous vehicle with previously-prepared, synthetic anhydrite calcium sulfate and the mixture subjected to conjoint calcination primarily to stabilize the calcium sulfate. After calcination, the products prepared according to both of the above-described methods are subjected to various after-treatments including a disintegration to render them fit for use in surface-coating compositions.

An obvious disadvantage of these prior art methods is the fact that the titanium dioxide and calcium sulfate are conjointly calcined. However, the time and temperature of calcination of titanium dioxide to obtain the maximum in pigment properties differ from the optimum time and temperature of calcination of calcium sulfate. Prior art methods have required therefore a compromise in calcination conditions. By the application of our discovery we are enabled to separately calcine the titanium dioxide and the calcium sulfate so as to obtain in each the most desirable properties for utilization as pigments.

As will be seen, our novel methods for preparing titanium dioxide-calcium sulfate composite pigment are distinct from any of the prior art procedures; first, in our methods we do not employ co-precipitation nor conjoint calcination. Furthermore, we differ from those blending methods which involve a separate milling of the titanium dioxide and calcium sulfate prior to the blending or mixing. The improved results of our invention rest primarily upon reduction of oil absorption and lower "break" possessed by the products of our invention as compared with prior art products. In addition, we have found that the capacity of the mill is greater when milling a mixture of titanium dioxide and calcium sulfate according to our invention than when milling the calcium sulfate alone. That is to say, according to our invention it is possible to put through a mill of given size a greater weight of mixture of titanium dioxide and calcium sulfate than calcium sulfate alone.

According to our invention, previously prepared calcined titanium dioxide obtained from any prior art process is mixed with previously prepared calcined calcium sulfate. The calcium sulfate should preferably possess the crystalline structure and form of anhydrite and should be preferably heat-treated in order to render it stable, i. e., non-hygroscopic and not susceptible to changes in crystallographic form or structure. The mixing may be carried out in any convenient type of mixing apparatus. We have found that type of mixer which is known as a "ribbon mixer" to be well adapted to our process. The ribbon mixer consists of a U-shaped trough in which a multiplicity of spiral strips of metal are caused to rotate, thereby accomplishing the mixing. After titanium dioxide and calcium sulfate have been intimately mixed, the mixture is fed through a pulverizing mill. Mills of the type of ring-roller mills, edge-runner mills and the like are examples of pulverizing mills which are useful in the practice of our invention. The so-called Raymond mill which is a ring-roller mill is especially suitable. The emerging pulverized mixture is then ready for use as a pigment. It will be found to possess a lower oil absorption value and a lower "break" than any of the products of the prior art, whether prepared by co-precipitation, conjoint calcination, or dry blending of separately milled ingredients. By oil absorption we mean, of course, the capacity of a pigment to absorb oil before becoming wet by the oil. For discussion of oil absorption and method of test see "Physical and Chemical Examination of Paints, Varnishes, Lacquers, Colors" 8th edition, pp. 540-560: H. A. Gardner (1937). The oil absorption values given in the examples were obtained by the so-called "spatula" method. Thus, it will be seen that in many cases a pigment which possesses a lower oil absorption is more desirable for the preparation of oleaginous coating compositions than a pigment possessing a high oil absorption.

Time of milling is not a factor of the practice of our invention but the mixture of titanium dioxide and calcium sulfate is fed through the mill at the capacity thereof. The following is a specific example of the practice of our invention from which, however, no limiting deductions are to be drawn:

*Example No. 1*

Synthetically prepared calcium sulfate having the crystalline structure and form of anhydrite was calcined at 860° C. to stabilize it. It possessed an oil absorption value of 40.0 and a pH value of 9.4. 70 parts by weight of this anhydrite was mixed in a ribbon mixer with 30 parts by weight of previously prepared calcined titanium dioxide having an oil absorption of 27.0. After thorough mixing was attained, the mixture was milled in a ring-roller mill and the capacity thereof was found to be about 114 pounds per hour. After milling, the pigment was found to possess an oil absorption value of 18.9 and a "break" of 70 seconds.

As a basis for comparison with the product of the above example, we took 70 parts by weight of the same anhydrite and milled it in the same mill. The capacity of the mill was found to be only 104 pounds per hour. We mixed this milled calcium sulfate with 30 parts of previously prepared calcined and separately milled titanium dioxide, identical with that used in the above example. After mixing was complete, the product had an oil absorption of 21.2 and a "break" of 240 seconds.

A comparison of three standard commercial preparations of titanium dioxide and calcium sulfate pigments prepared by dry mixing previously separately milled calcined calcium sulfate with previously prepared calcined titanium dioxide gave oil absorption figures of 20.8, 22.1, and 21.2, respectively, and "break" values of 110, 240+, and 240+ respectively. Pigments identical in composition were prepared according to our present invention, that is by conjoint milling of the mixture of the unmilled calcium sulfate and the same titanium dioxide. Oil absorption figures of 16.3, 18.5 and 19.4, respectively, were obtained with "break" values of 40, 70, and 80 respectively. In comparison with the composite pigments prepared by co-precipitation and conjoint calcination, we find that it is generally impossible to obtain such products with "break" values substantially lower than 120.

The improved ease of the conjoint milling is shown by the fact that the mill capacities when milling the anhydrite of the above examples alone were 173, 104 and 133 pounds per hour respectively. On the other hand, when the mixtures of anhydrite and titanium dioxide were milled together to give composite pigments with the reduced oil absorptions and "breaks" noted above, the mill capacities, in the same roller mill under identical milling conditions, were 188, 267, and 300 pounds per hour respectively.

The products obtainable from the practice of our invention are particularly useful in forming enamels by mixing with oleaginous, resinous, film-forming vehicles. We have found that the lower the "break" values the higher will be the gloss of the resultant paint film, and the products of our invention, therefore, represent a distinct preference over the prior art products in this particular. They are also particularly useful in the preparation of pigmented paper, rubber, delustering of artificial silk, preparation of printing inks, preparation of quick-drying, aniline inks and in fact, wherever a composite titanium dioxide-calcium sulfate pigment finds use.

The foregoing description of our invention has been given for clearness of understanding and no undue limitations should be deduced therefrom, but the appended claims should be construed as broadly as possible in view of the prior art.

We claim:

1. A process for the preparation of a composite titanium dioxide-calcium sulfate pigment possessing improved low oil absorption and "break" which comprises dry mixing calcined titanium dioxide with calcined calcium sulfate until a uniform mixture is obtained and then subjecting this mixture to a pulverizing milling treatment, in a mill of the ring roll type.

2. A process for the preparation of a composite titanium dioxide-calcium sulfate pigment possessing improved low oil absorption and "break" which comprises dry mixing calcined titanium dioxide with previously prepared calcium sulfate having the crystalline form and structure of anhydrite until a uniform mixture is obtained and then subjecting the resultant mixture to pulverizing in a ring-roller mill.

3. A process for the preparation of a composite titanium dioxide-calcium sulfate pigment possessing improved low oil absorption and "break" which comprises dry mixing calcined titanium dioxide with previously prepared calcium sulfate having the crystalline form and structure of anhydrite, the weight of titanium dioxide being between about 20 percent and 40 percent and the weight of calcium sulfate being between about 60 percent and 80 percent, until a uniform mixture is obtained and then subjecting the resultant mixture to a pulverizing milling treatment, in a mill of the ring roll type.

WALTER W. PLECHNER.
HUGH V. ALESSANDRONI.